United States Patent
Kern et al.

[15] 3,666,049
[45] May 30, 1972

[54] EXPANDER ROLL ASSEMBLY WITH OIL-MIST LUBRICATION

[72] Inventors: Thomas W. Kern; George L. Barringer; William Ross Wands; Charles W. Leonard; Gerald W. Goodman, all of Salisbury, N.C.

[73] Assignee: Kern Roll and Rubber Company, Salisbury, N.C.

[22] Filed: Oct. 12, 1970

[21] Appl. No.: 79,914

[52] U.S. Cl. ..........................184/6.26, 184/14, 308/187
[51] Int. Cl. ..........................................F16n 7/26
[58] Field of Search ..............184/6.26, 55, 14, 56; 308/187

[56] References Cited

UNITED STATES PATENTS 2,950,150  8/1960  Ashworth ..............................308/187
2,986,433  5/1961  Hermann ...........................184/6.26 X

FOREIGN PATENTS OR APPLICATIONS 574,263  3/1958  Italy......................................184/6.26

OTHER PUBLICATIONS

Giannoti; R. J., Performance of High Speed Ball Bearings with Jet Oil Lubrication. In Lubrication Engineering, pp. 316–322, August, 1966.

*Primary Examiner*—Manuel A. Antonakas
*Attorney*—Mason, Fenwick & Lawrence

[57] ABSTRACT

An expander roll assembly, wherein the shaft has a lubricating conduit extending along substantially its axial length, an oil-mist lubricant supply is coupled to an end of the lubricating conduit, and spray nozzle fittings are provided laterally adjacent each ball bearing unit between the outer surface portion of the roll and the shaft to spray oil-mist lubricant against a portion of each ball bearing assembly. An end seal assembly is provided to protect against entry of dust and similar foreign matter at the ends of the roll, and structure is provided for withdrawal of any surplus oil-mist lubricant to an external collecting facility.

11 Claims, 7 Drawing Figures

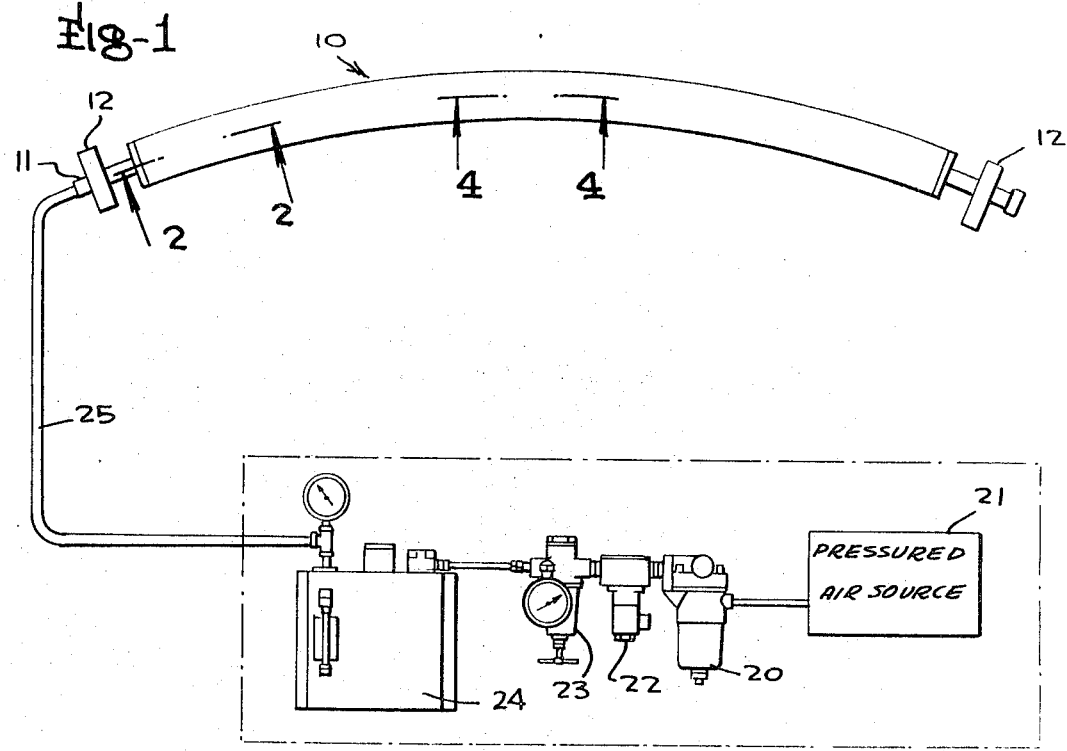
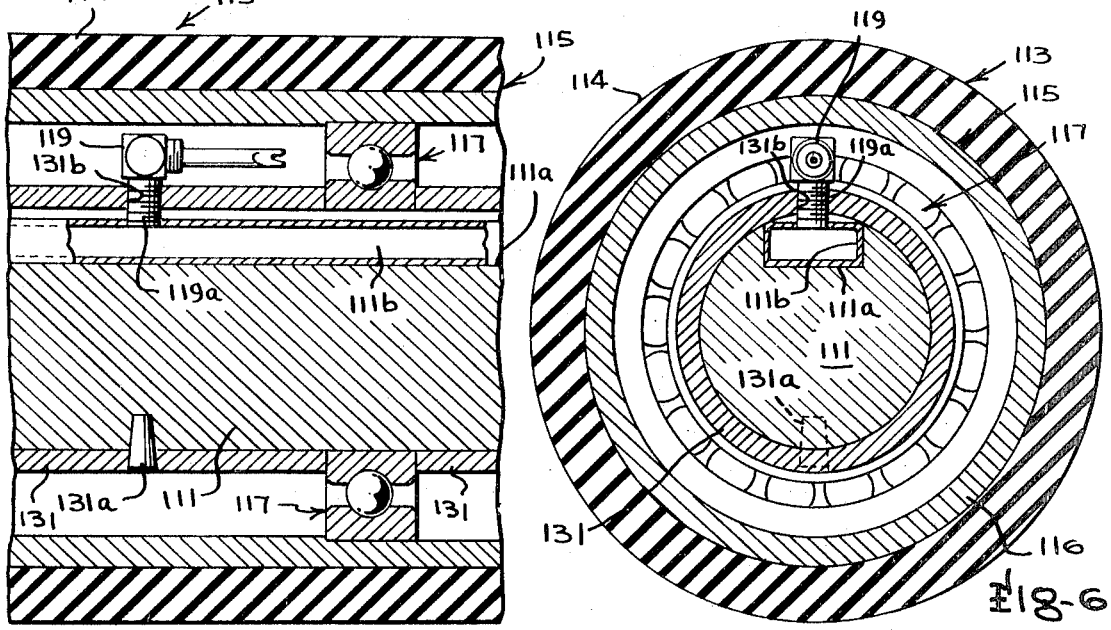
INVENTORS
THOMAS W. KERN,
GEORGE L. BARRINGER,
WILLIAM ROSS WANDS,
CHARLES W. LEONARD &
BY GERALD W. GOODMAN
Mason, Fenwick & Lawrence
ATTORNEYS

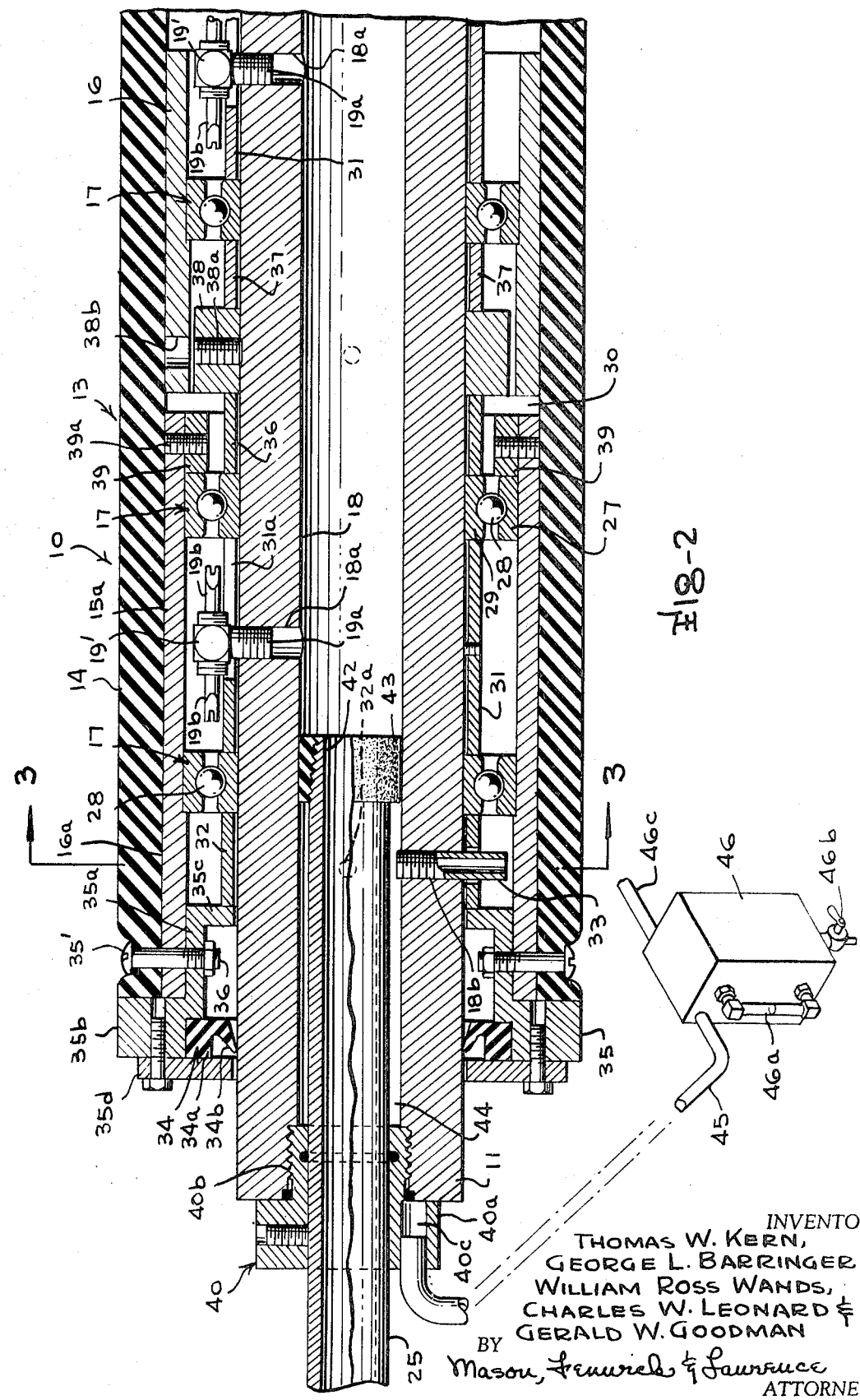

INVENTORS
THOMAS W. KERN,
GEORGE L. BARRINGER,
WILLIAM ROSS WANDS,
CHARLES W. LEONARD &
GERALD W. GOODMAN
BY
Mason, Fenwick & Lawrence
ATTORNEYS

EXPANDER ROLL ASSEMBLY WITH OIL-MIST LUBRICATION

BACKGROUND AND OBJECTS OF THE INVENTION

The present invention relates in general to expander rolls for flexible sheet materials, such as are commonly used for spreading traveling sheets of fabric, paper, films, and the like, or to eliminate wrinkles in the sheets. Particular examples are expander rolls used to keep felt and screen traveling together in paper making devices, and to keep paper at calendar rolls straight without wrinkles.

More particularly, the present invention relates to expander rolls of the general type wherein a flexible surface sheath of rubber or the like is mounted for rotation about the axis of a rigid curved axle whose opposite ends are customarily fixed, with the roll disposed transversely of and in engagement with a traveling sheet, such as used in the paper and textile arts. The draft of the sheet causes rotation of the curved roll, and the rotation of the roll effects transverse expansion of the sheet when the roll is disposed with its convex side facing upstream relative to sheet travel. The action imparted by the curved roll may be an expanding or stretching action, or it may be merely a spreading or smoothing action. In either case, the primary action is achieved as a function of the amount of bow or deviation of the center point on the roll face from the axis of the shaft, the position of the expander roll in regard to the material being run over it, and the wrap angle of the material in regard to the receiving and discharging of the material being run.

Since expander rolls may exceed 400 inches in face length, and many have a face length in the 300 to 350 inch range, it has been considered that it was not practical to lubricate the roll while in service. Even if grease could be forced through conduits into the interior of the roll, it would be virtually impossible to get grease into the bearings where it is needed. Heretofore, the initial lubrication prior to installation has been the only lubrication the bearings on the internal portions of the roll received to attempt to prolong bearing life. The inability to lubricate bearings of such expander rolls while the roll is in operation and is being used has therefore been a significant factor in determining how long such an expander roll can remain in service. Also, the formation of condensate within the roll due to heating and cooling of internal atmosphere has led to earlier bearing failure than would normally be anticipated where proper maintenance can be practiced. Bearing failure from inability to lubricate during operation for an extended period of time approximating normal sleeve life, without getting a build-up of oil which would lead to premature failure and from formation of condensate and associated rust and scale, together with break downs in the end seals which would permit an entrance for undesirable material such as dust, grime and wetting out materials, are the most frequent causes of failure of such rolls and are the cause of great expense to users because of the frequency with which failing rolls have to be replaced during the course of a normal working day and the resultant losses from downtime.

An object of the present invention is the provision of a novel expander roll construction and system whereby oil-mist lubrication of the internal bearing areas of the roll is continuously achieved during operation, providing for a significant increase in bearing and roll life.

Another object of the present invention is the provision of a novel expander roll and oil-mist lubrication system wherein lubricant in minute droplets is transferred under positive air pressure through the fixed shaft of the roll and is discharged as oil-mist toward the bearings in the interior of the roll continuously during operation of the roll to achieve significant increases in bearing and roll life.

Another object of the present invention is the provision of a novel expander roll construction wherein the expander roll is formed in components assembled axially along the curved shaft and has a construction rendering the rolls more readily repairable.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a somewhat diagrammatic view of an expander roll and oil-mist lubrication system embodying the present invention;

FIG. 2 is a fragmentary longitudinal vertical section view through an end portion of the expander roll, taken along the line 2—2 of FIG. 1;

FIGS. 6 and 7 are transverse and fragmentary longitudinal section views illustrating a modification of the expander roll construction.

DETAILED DESCRIPTION OF A PREFERRED EMBODIMENT

Figure 4:
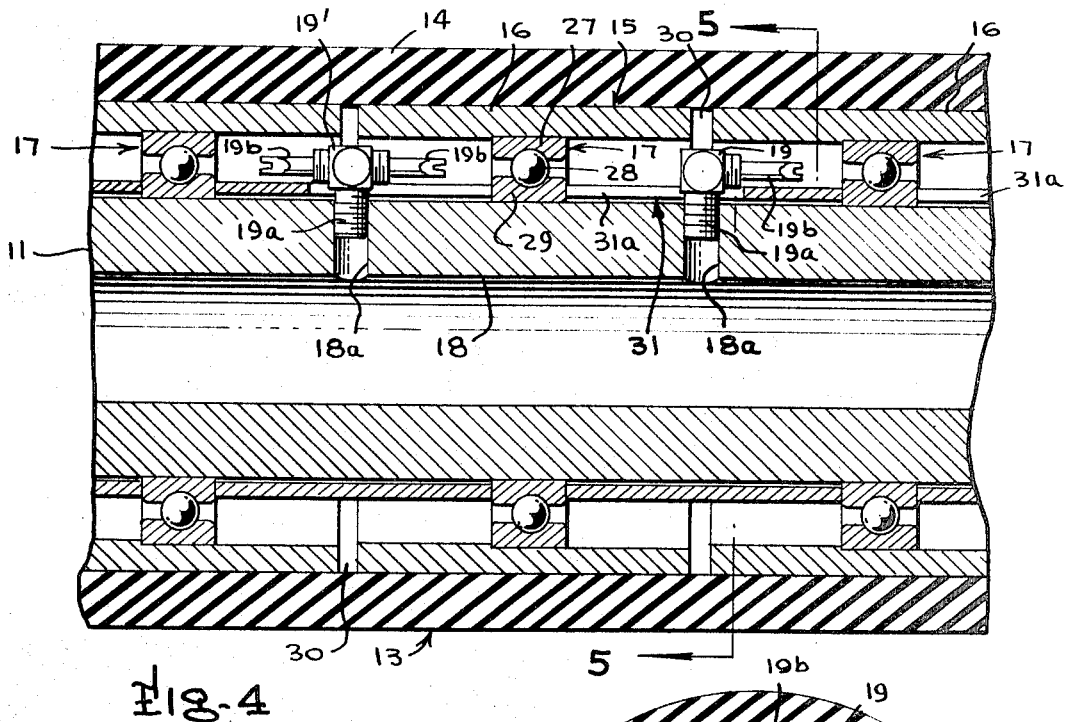
FIG. 4 is a fragmentary longitudinal vertical section view of a center portion of the expander roll, taken along the line 4—4 of FIG. 1.
Figure 5:
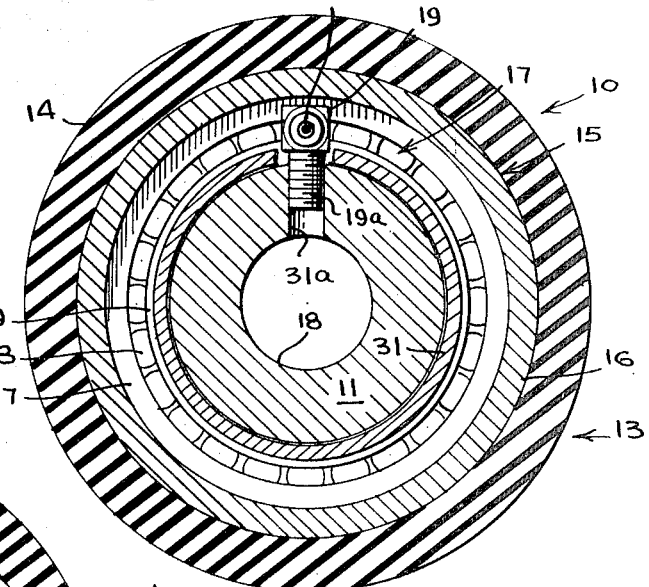
FIG. 5 is a transverse vertical section view of the expander roll, taken along the line 5—5 of FIG. 4.
Figure 3:
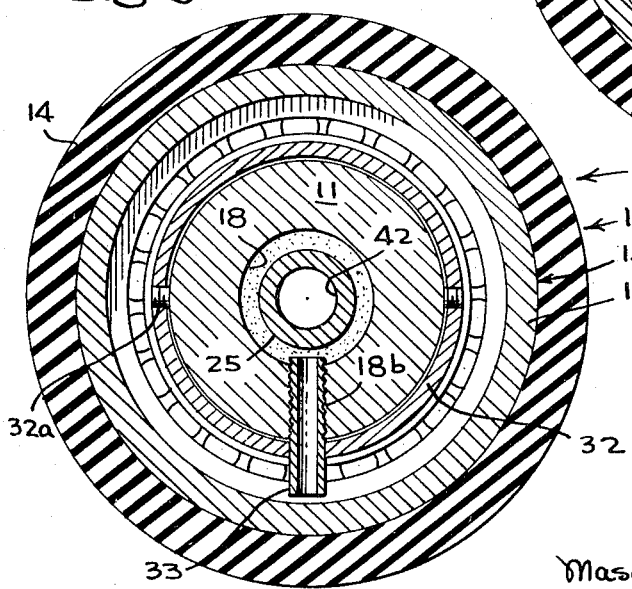
FIG. 3 is a transverse vertical section view of the expander roll, taken along the line 3—3 of FIG. 2.

Referring to the drawings, wherein like reference characters designate corresponding parts throughout the several figures, and particularly to FIG. 1, the expander and spreader roll of the present invention is indicated generally by the reference character 10, and is generally referred to hereinafter simply as an expander roll, although it will be understood that the roll may be used for any of the applications for which such arcuately curved rolls are normally used, either for expanding or spreading traveling sheets of material, or eliminating wrinkles from the sheet, or for keeping felt and screen webs traveling together, and the like. The expander roll 10 includes a bowed center shaft 11, which is shown as a permanently deformed tubular member whose axis is arched or bowed in a single plane corresponding to the plane of the paper in FIG. 1. The opposite ends of the center shaft or axle 11 are fixed in suitable mounting brackets indicated diagrammatically at 12 so as to rigidly hold the center shaft 11 against movement, and between the mounting brackets 12 and rotatably supported on the center shaft 11 is an enlarged cylindrical flexible surface expander roll 13 formed of an outer annular flexible surface sheath 14 of rubber or the like formed on a series of spool assemblies generally indicated at 15 which are supported in axial end-to-end relation on the center shaft 11. The spool assemblies are substantially alike, except for the spool assemblies at either end of the roll which are of slightly modified form. The spool assemblies include an outer annular cylindrical spool 16 collectively with the other spools defining a cylindrical metallic surface to which the outer flexible surface sheath 14 is bonded, each of the spools 16 being rotatably mounted on a single ball bearing unit 17 except for the two endmost spool units 16a, although it will be understood that each spool may be mounted upon a plurality of bearings if desired.

In accordance with the present invention, this expander roll assembly 10 is to be continuously supplied during operation with oil-mist to provide for continuous lubrication of the internal bearing surfaces of the roll. To this end, the center shaft 11 in the preferred embodiment illustrated in FIGS. 1 to 5 is a hollow cylindrical shaft having a circular cross-section center bore 18 extending throughout its length, having radial openings 18a formed therein at appropriate locations in which spray fittings generally indicated at 19 are mounted to direct oil-mist onto the bearing surfaces. Conventional oil-mist system components, such as the conventional oil-mist system components, such as the conventional oil-mist supply components produced by the ALEMITE Division of Stewart-Warner Corporation are coupled to one end of the center shaft 11 to supply the oil-mist to the center bore 18. As illustrated in FIG. 1, these oil-mist system components may comprise an air line filter and water separator 20 coupled to a source of pressurized air indicated at 21, an air solenoid valve 22, an air pressure regulator 23, and an oil-mist generator 24. The filter and water separator 20 is provided to assure a clean air supply to the oil-mist generator 24, the air solenoid valve 22 provides means to start and stop the air supply to the oil-mist generator 24, and the air pressure regulator 23 permits control of the oil-mist generator atomizing air pressure. The oil-mist generator 24 includes a venturi nozzle, an oil lift tube, a reservoir, and an oil flow adjustment screw in the form in which this oil-mist generator 24 is commercially produced by the Stewart-Warner Corporation. In the oil-mist generator 24, compressed air from the source 21 filtered by the separator 20 and regulated by the pressure regulator 23 is passed through the venturi and oil, siphoned from the reservoir by the air flow, is atomized into a fine spray. Baffles downstream from the venturi nozzle cause the larger oil particles to coalesce and return to the reservoir, while the remaining air-oil mixture is discharged as oil-mist through a manifold conduit 25 connected to the supply end of the center shaft 11. The oil-mist contains oil particles averaging about one and one-half microns in diameter, which are conveyed through the piping 25 at selected velocities, for example up to about 24 feet per second. Preferably, the manifold conduit or piping 25 for about the first three hundred diameters immediately adjacent the oil-mist generator 24 is arranged in a slightly upwardly sloping position to effect gravity drainage of oil condensate back to the generator 24 as most of the oil condensation occurs within the distance of the first three hundred diameters of the manifold conduit 25.

Each of the spool assemblies 15 except for the endmost spool assemblies 15a are of substantially like construction, and comprise the outer annular spool 16, which is a steel tube or an alloy tube encasing at its axial center one of the outer bearing races 27 of the ball bearing unit 17. In the preferred example, the spool 16 is bored to a slightly smaller inner diameter than the outer diameter of the bearing unit over part of its axial length, providing an annular shoulder against which the outer bearing race may abut, the larger diameter portion of the spool bore being sized so as to press fit on the outer bearing race. The ball bearing units 17 are loosely fitted on the center shaft 11 and include precision ground steel balls 28 and inner race 29. These bearing assemblies 17 are open at the sides along the steel balls 28 between the inner and outer races, and rotatably support the spools 16 of the respective spool assemblies. The plurality of spools 16 spaced along the shaft collectively support the outer rubber tube or sheath 14, formed of rubber or other suitable resilient flexible material, which forms a unitary uninterrupted tube over the axial length of the expander roll 13. Since the axes of rotation of the spools differ somewhat from spool to spool, the spools 16 are spaced slightly apart axially on the bowed center shaft 11 with small intervening gaps 30, to accommodate the slight variations in spacing between the ends of the spools 16 as they rotate about the center shaft.

The respective bearing assemblies 17 of the successive adjacent spool assemblies 15 are maintained in properly spaced relation by annular spacer sleeves generally indicated at 31 interposed between adjacent inner bearing races 29. The spacer sleeves 31 in the preferred form have an elongated slot 31a extending from the center through one end thereof of a width to accommodate the diameter of the threaded inlet nipple 19a of the spray fittings 19 threaded in the radial openings 18a of the shaft to permit the successive spacer sleeves 31 to be axially moved along the shaft 11 from the appropriate end thereof into abutment with the bearing unit 16 next toward the center of the expander roll with the threaded nipple 19a of the spray fitting accommodated in the slot 31a. Each of the spool assemblies 15, except for the two endmost ones, are of like construction except that the spray fitting 19' at the longitudinal center of the shaft is a double spray fitting, having a pair of oppositely directed discharge nozzle formations 19b directed respectively toward the two bearing assemblies 17 flanking the vertical or transverse plane through the longitudinal center of the shaft and roll, whereas the spray fittings 19 associated with the bearing assemblies 17 for the other spool assemblies 15 each have only a single discharge nozzle formation 19b directed toward the next adjacent bearing assembly 17 in the direction of the nearest end of the axle, as illustrated in FIG. 4.

The end spool assemblies 15a each comprise an outer elongated spool 16a of longer axial length than the outer spools 16 so that the endmost spools 16a can accommodate a pair of ball bearing units 17 spaced apart a distance corresponding substantially to the spacing between the single ball bearing units of the adjacent other spool assemblies 15. A double spray fitting 19' similar to the one provided in the center section of the roll is also centered between the two bearing units 17 of the end spool assembly 15a, with the two oppositely directed discharge nozzle formations 19b directed toward the two ball bearing units 17 and the threaded inlet nipple 19a threaded into the radial opening 18a of the center shaft 11 to communicate the spray fitting 19' with the bore 18. Alternatively, a pair of oppositely directed single nozzle spray fittings may be located in axially and angularly staggered relation to the shaft 11 in suitable tapped radial openings like the openings 18a to direct oil-mist lubricant onto the two endmost bearing units at each end. The two ball bearing units 17 in each of the endmost spool assemblies 15a are maintained in properly spaced relation from each other by a spacer 31 like the spacers employed in the other portions of the roll, having a slot 31a extending from the mid-portion of the spacer through one end thereof to accommodate the inlet nipple 19a of the spray fitting 19'. An additional short annular spacer sleeve 32 surrounds the shaft 11 immediately outwardly of the endmost ball bearing unit 17 at each end and is held in place by suitable means such as two diametrically opposite Allen screws, one of which is indicated at 32a in FIG. 2. A sump tube, indicated at 33, extends through an opening in the bottom or lowermost portion of the locator sleeve 32 and is threaded through a vertical radial opening 18b in the center shaft 11, with the lower end of the sump tube 33 spaced about one-sixteenth to one-eighth inch from the lowermost portion of the inner surface of the endmost spool 16a at one end of the expander roll assembly.

Outboard of the locator sleeve 32 is an end seal assembly, which in the preferred embodiment comprises an annular rubber sealing ring 34 having thicker base ring portion 34a and a thinner flange portion 34b extending along a conical path inwardly from the base ring portion 34a and resiliently pressed against the outer cylindrical surface of the shaft 11. The base portion 34a of the sealing ring 34 is supported in the annular recess 35' of a metallic end cap 35 having a cylindrical center portion 35a to be disposed in inwardly coaxial relation to the end of the spool 16a with a radially outwardly projecting flange 35b extending from the outer end of the cylindrical center portion to the outer surface of the rubber sheath or tube 14 and a radially inwardly projecting annular flange 35c extending from the inner end of the cylindrical center portion 35a to within about one-sixteenth inch of the outer surface of the shaft 11. The end cap 35 is secured to the end of the spool 16a by a plurality of radial bolts 35' extending through the rubber surface sheath 14, the spool 16a, and the center portion 35a of the end cap at plural positions circumferentially spaced about the roll, held in place for example by threaded nuts as illustrated in FIG. 2. It will be appreciated that other fastening means for the end cap may be provided if desired. An annular retaining plate 35d is secured against the outer end surface of flange 35b by bolts 35e to retain the sealing ring 34 seated in recess 35'. This construction facilitates replacement of the sealing ring 34 whenever desired.

Additionally, a pair of axially spaced short inner spacer sleeves 36 and 37 and a cylindrical locking collar 38 disposed therebetween are provided between the second and third ball bearing assemblies 17 counting from the end of the roll, to collectively define the proper spacing between the second and third ball bearing units, and an annular retaining ring 39 having an outer diameter corresponding to the inner diameter of the spool 16a is provided, which is designed to be removably fastened in position against the outer bearing race 27 of the second ball bearing unit 17 counting from the end, by means of a locking screw 39a extending through tapped openings in the spool 16a and locking sleeve 39. The locking collar 38 has a pair of set screws 38a in radial threaded bores therein arranged at about 90° from each other and adapted to register with access openings 38b in the spool 16 of the spool assembly immediately adjacent each of the endmost spool assemblies for insertion of a screwdriver bit or other similar tool into engagement with the set screws 38a before the outer rubber sheath 14 has been applied to the roll.

In assembling the roll, one of the double spray fittings 19' is threaded into the radial opening 18a at the longitudinal center of the shaft 11, the spacer sleeve 31 is fitted onto the shaft as illustrated in FIG. 4, and the ball bearing units 17 immediately flanking this centermost spray fitting with their associated spools 16 press fitted thereon are fitted over the opposite ends of the shaft 11 and moved into position wherein their inner races 29 abut the spacer sleeve 31 associated with the centermost spray fitting 19'. The successive single orifice spray fittings 19 are assembled in the radial openings 18a in the shaft 11 progressing towards the ends from the center position with the associated spacer sleeves 31, ball bearing units 17 and outer spools 16 applied in a similar manner progressing outwardly from the center of the expander roll assembly. When the spool assembly for the last spool section 15 before the endmost sections 15a have been completed, the end sections 16a are then assembled onto the shaft by a special procedure. This involves first applying the short spacer sleeve 37, the locking collar 38, and the short spacer 36 on the shaft 11, and locking the locking collar 38 to the shaft 11 to hold the already assembled spool assemblies 15 in proper position. The retainer ring 39 is then loosely fitted on the shaft 11 and moved to a position adjacent the locking collar 38. The second bearing unit 17 counting from the end of the shaft is then assembled on the shaft and moved into position abutting the spacer sleeve 36, the double spray fitting 19' for the end spool assembly is threaded into the radial opening 18a in the shaft, the spacer sleeve 31 is fitted on the shaft with the inlet nipple 19a received in its slot 31a, and the outermost ball bearing unit 17 is applied on the shaft and moved into abutment with the spacer sleeve 31. The short locator sleeve 32 is then applied on the shaft and moved into abutment with the inner race of the outermost ball bearing unit 17, it is locked in position by the two diametrically opposite Allen screws 32a and the sump tube 33 is threaded into the appropriate openings in the sleeve 32 and shaft 11. The end spool 16a is then slipped over the first and second ball bearing units 17 counting from the end of the shaft, and the retainer ring 39, which was left loose surrounding the shaft in outwardly surrounding relation to the spacer sleeve 36, is fitted into the bore of the spool 16 and locked to the end spool 16a at the position illustrated in FIG. 2 by insertion of the locking screw 39a when the threaded apertures therefor are in registry. The end cap 35 and sealing ring 34 may have already been assembled on the end spool 16a or may be assembled after the end spool is installed on its bearing units.

The center bore 18 of the shaft 11 will then be coupled at its supply end, for example the left hand end as viewed in FIGS. 1 and 2, to the oil-mist manifold conduit 25 and provision made for collection of any surplus oil-mist or condensation from the interior of the expander roll. This may be accomplished by assembling an annular end fitting or plug 40 to the shaft at the supply end of the shaft. The end fitting 40 in the illustrated embodiment comprises an enlarged diameter head portion 40a to butt against the end of the shaft 11 and a threaded neck portion 40b to be threaded into a threaded end portion of the shaft bore 18. The end fitting 40 has a central bore 41 through which a pipe section 42 forming the end portion of the oil-mist manifold pipe 25 extends to a position just inwardly of, or toward the longitudinal center of the roll from, the sump tube 33. An O-ring 41a located in an annular seat therefor in the surface of the bore 41 seals against the surface of pipe section 42. The supply pipe end portion 42 is of smaller diameter than the bore 18 of the shaft 11 leaving a space between its outer surface and the inner surface of the bore 18. A sealed chamber 44 is formed in this space in the zone between the neck portion 40b of the end fitting 40 and the discharge end of the supply pipe section 42, by means of a flexible sealing ring 43 which may have a tapered threaded bore threaded onto a tapered threaded end of the pipe section 42 to be expanded by the pipe section into sealing engagement with the walls of the bore 18 as shown. The end fitting 40 is provided with a small outlet opening 40c paralleling the central bore 41 and communicating through the neck 40b with the chamber 44 defined between the end fitting 40 and sealing ring 43, with the outer end of the opening 40c connected by a tubular conduit 45 to a separating receptacle 46 having, for example, a sight glass 46a indicating the level of any liquid therein, a pet cock oil outlet 46b at its lower end, and an air exhaust outlet 46c near its upper end, to permit separation of air from any oil-mist returning through the sump tube 33, chamber 44, opening 40b and conduit 45. The opposite or downstream end of the shaft 11 may be closed by either a cap sealed on the end of the shaft, or by a pressure gauge communicating with the bore 18 to continuously monitor the pressure within the bore.

In the operation of the apparatus, oil-mist is continuously supplied from the oil-mist generator 24, manifold conduit 25, and pipe section 42 to the bore 18 of the shaft 11 during the operation of the expander roll assembly. The oil-mist, being a mixture of oil particles in pressurized air, passes through the radial opening 18a of the shaft into the bores of the spray fittings 19 and 19' and is discharged as a fine spray directly against the exposed portions of the steel balls 28 in the ball bearing units 17 to continuously lubricate them during operation. While the ball bearing units will have been initially lubricated with light oil at the time of installation, they will be positively lubricated at all times by the oil-mist spray during the remaining operation of the expander roll assembly. The internal portion of the roll will have a positive air pressure at all times, for example about 2 p.s.i. above ambient pressure, so that the bearings will never run dry. Also the presence of controlled air will lower or substantially eliminate the condensate problem. The oil-mist will be dispensed substantially equally throughout the roll. When the length of the roll requires it, the oil-mist may be supplied from both ends of the roll with blockage in the center of the roll. Any excessive pressure within the roll is allowed to escape between the flange of the flexible end sealing ring 34 and the surface of the shaft 11, thus eliminating any condensed pressure problem.

It will be appreciated that where the use of double spray units 19' where illustrated and described in connection with the first embodiment, a pair of axially spaced single spray units 19 arranged with their discharge nozzle formations directed in opposite directions could be employed, in which case a pair of appropriate closely spaced radial openings 18a must be provided in the shaft at the proper locations, and the spacer 31 would have either a longer or wider slot therein for accommodating the inlet nipples of both of the spray units, or would have a continuous slot along its entire axial length facilitating its insertion on the shaft during assembly of the expander roll.

An alternate arrangement is illustrated in cross-section in FIGS. 6 and 7. In this form, the shaft 111 has a kerf 111a formed at a selected circumferential position along its periphery to house a rectangular tube 111b which forms the conduit for distributing the oil-mist throughout the length of the shaft 111. The expander roll 113 is otherwise similar to the expander roll of the previously described embodiment, having a flexible outer sheath 114, and a series of spool assemblies 115 located axially along the shaft including a cylindrical annular outer sleeve 116 and a ball bearing unit 117 for each of the spool assemblies or sections except for the endmost ones, with the inner race of each ball bearing unit 117 directly fitted on the shaft 111. However, the spacer sleeves indicated at 131 in FIGS. 6 and 7 are locked against movement on the shaft 111 by locking pins 131a, and each has a radial port or threaded opening 131b therein at substantially the longitudinal or axial center of the spacer into which is fitted the threaded inlet nipple 119a of spray fittings 119 like the spray fittings described in connection with the previous embodiment. End seal and end cap structures similar to the previously described construction is also provided with this form, and the oil-mist manifold conduit 25 is suitably connected to one or both ends of the rectangular tubing forming the oil-mist conduit in the channel or kerf of the shaft 111. The oil-mist distributing tube 111a is of course drilled at the locations of the ports 131b of the spacers to permit communication of the oil-mist from the interior of the distributing tube 111a to the respective spray fittings 119.

What is claimed is:

1. An expander roll assembly comprising a rigid cross-sectionally round shaft bowed in the form of a shallow arc, a series of annular spool assemblies rotatably mounted in axially spaced relation along the shaft, each spool assembly including an annular cylindrical spool and a ball bearing assembly for supporting the spool concentrically on the shaft, said shaft having a lubricant conduit formed therein extending substantially the axial length thereof for conveying oil-mist lubricant along the shaft, a source of oil-mist lubricant providing a mixture of oil droplets and air under pressure, means connected to one end of the shaft for conveying the oil-mist to said conduit, a spray nozzle fitting laterally adjacent each ball bearing assembly located between the shaft and an adjacent one of said spools for discharging oil-mist spray toward and against a portion of the adjacent ball bearing assembly to continuously lubricate the latter during use of the expander roll, means defining radial ports extending from the lubricant conduit to each of the respective spray nozzle fittings to communicate the oil-mist to the latter, and a resilient flexible surface sheath encircling all of said spool assemblies and secured to said spools to form therewith a roll for unitary rotation about the shaft, said lubricant conduit being a circular bore concentric with the center axis of the shaft and extending the length of the shaft, said spray fittings each having a discharge nozzle portion paralleling the axis of the shaft and a threaded inlet nipple at right angles thereto, said ports being threaded openings into which said inlet nipples are threaded, each said ball bearing assembly including an inner and outer race, and said assembly including an annular spacer sleeve concentrically encircling the shaft between each adjacent pair of ball bearing assemblies with its opposite ends abutting the inner races of said ball bearing assemblies, said spacer sleeve having a slot paralleling its axis and opening through one end of the sleeve for slidably accommodating a portion of the inlet nipple of said spray nozzle fitting.

2. An expander roll assembly comprising a rigid cross-sectionally round shaft bowed in the form of a shallow arc, a series of annular spool assemblies rotatably mounted in axially spaced relation along the shaft, each spool assembly including an annular cylindrical spool and a ball bearing assembly for supporting the spool concentrically on the shaft, said shaft having a lubricant conduit formed therein extending substantially the axial length thereof for conveying oil-mist lubricant along the shaft, a source of oil-mist lubricant providing a mixture of oil droplets and air under pressure, means connected to one end of the shaft for conveying the oil-mist to said conduit, a spray nozzle fitting laterally adjacent each ball bearing assembly located between the shaft and an adjacent one of said spools for discharging oil-mist spray toward and against a portion of the adjacent ball bearing assembly to continuously lubricate the latter during use of the expander roll, means defining radial ports extending from the lubricant conduit to each of the respective spray nozzle fittings to communicate the oil-mist to the latter, and a resilient flexible surface sheath encircling all of said spool assemblies and secured to said spools to form therewith a roll for unitary rotation about the shaft, said lubricant conduit being a tube of rectangular cross-section extending substantially the length of the shaft, and said shaft having a kerf along its surface spaced uniformly from the axis of the shaft, and means defining radial ports communicating each of the spray nozzle fittings with said tube, each said ball bearing assembly including an inner and outer race, and said assembly including an annular spacer sleeve concentrically encircling the shaft between each adjacent pair of ball bearing assemblies with its opposite ends abutting the inner races of said ball bearing assemblies, said spacer sleeve having a slot paralleling its axis and opening through one end of the sleeve for slidably accommodating a portion of said spray nozzle fitting.

3. An expander roll assembly as defined in claim 2, wherein each of the endmost spool assemblies at the opposite ends of said roll include an end seal assembly carried by the spool including an annular sealing ring having a base ring portion and a flange portion extending therefrom resiliently bearing against the surface of the shaft, and a metallic annular end cap fixed to the spool of each of said endmost spool assemblies having an annular recess in which said base ring portion is removably seated, an annular plate removably secured to said end cap to retain said sealing ring in said recess, said end cap being located in concentric coaxial relation to the shaft and having a circular center opening for the shaft bounded by a cylindrical surface spaced in close proximity to the surface of the shaft.

4. An expander roll assembly comprising a rigid cross-sectionally round shaft bowed in the form of a shallow arc, a series of annular spool assemblies rotatably mounted in axially spaced relation along the shaft, each spool assembly including an annular cylindrical spool and a ball bearing assembly for supporting the spool concentrically on the shaft, said shaft having a lubricant conduit formed therein extending substantially the axial length thereof for conveying oil-mist lubricant along the shaft, a source of oil-mist lubricant providing a mixture of oil droplets and air under pressure, means connected to one end of the shaft for conveying the oil-mist to said conduit, a spray nozzle fitting laterally adjacent each ball bearing assembly located between the shaft and an adjacent one of said spools for discharging oil-mist spray toward and against a portion of the adjacent ball bearing assembly to continuously lubricate the latter during use of the expander roll, means defining radial ports extending from the lubricant conduit to each of the respective spray nozzle fittings to communicate the oil-mist to the latter, and a resilient flexible surface sheath encircling all of said spool assemblies and secured to said spools to form therewith a roll for unitary rotation about the shaft, a sump tube within one of the endmost spool assemblies located between the ball bearing assembly thereof and the end of the roll, said sump tube being supported by said shaft in downwardly extending vertical relation therefrom having an intake opening at its lower end located close to the lowermost portion of the inner surface of the associated spool for withdrawal of any condensate and excess oil-mist into said sump tube, said shaft having a sump port therein communicating said sump tube with said conduit, means for isolating a first portion of said conduit directly communicating with said sump port from the other portions of the conduit in communication with said radial ports, and separating chamber means externally of the shaft coupled to said first portion of said conduit for receiving fluid from said sump tube and collecting liquid constituents thereof.

5. An expander roll assembly as defined in claim 4, wherein said lubricant conduit is a circular bore concentric with the center axis of the shaft and extending the length of the shaft, and said spray fittings each having a discharge nozzle portion paralleling the axis of the shaft and a threaded inlet nipple at right angles thereto, said ports being threaded openings into which said inlet nipples are threaded.

6. An expander roll assembly as defined in claim 4, wherein each of the endmost spool assemblies at the opposite ends of said roll include an end seal assembly carried by the spool including an annular sealing ring having a base ring portion and a flange portion extending therefrom resiliently bearing against the surface of the shaft, and a metallic annular end cap fixed to the spool of each of said endmost spool assemblies having an annular recess in which said base ring portion is removably seated, an annular plate removably secured to said end cap to retain said sealing ring in said recess, said end cap being located in concentric coaxial relation to the shaft and having a circular center opening for the shaft bounded by a cylindrical surface spaced in close proximity to the surface of the shaft.

7. An expander roll assembly as defined in claim 6, wherein said lubricant conduit is a circular bore concentric with the center axis of the shaft and extending the length of the shaft, and said spray fittings each having a discharge nozzle portion paralleling the axis of the shaft and a threaded inlet nipple at right angles thereto, said ports being threaded openings into which said inlet nipples are threaded.

8. An expander roll assembly comprising a rigid cross-sectionally round shaft bowed in the form of a shallow arc, a series of annular spool assemblies rotatably mounted in axially spaced relation along the shaft, each spool assembly including an annular cylindrical spool and a ball bearing assembly for supporting the spool concentrically on the shaft, said shaft having a lubricant conduit formed therein extending substantially the axial length thereof for conveying oil-mist lubricant along the shaft, a source of oil-mist lubricant providing a mixture of oil droplets and air under pressure, means connected to one end of the shaft for conveying the oil-mist to said conduit, a spray nozzle fitting laterally adjacent each ball bearing assembly located between the shaft and an adjacent one of said spools for discharging oil-mist spray toward and against a portion of the adjacent ball bearing assembly to continuously lubricate the latter during use of the expander roll, means defining radial ports extending from the lubricant conduit to each of the respective spray nozzle fittings to communicate the oil-mist to the latter, and a resilient flexible surface sheath encircling all of said spool assemblies and secured to said spools to form therewith a roll for unitary rotation about the shaft, a sump tube within one of the endmost spool assemblies located between the ball bearing assembly thereof and the end of the roll, said sump tube being supported by said shaft in downwardly extending vertical relation therefrom having an intake opening at its lower end located close to the lowermost portion of the inner surface of the associated spool for withdrawal of any condensate and excess oil-mist into said sump tube, said shaft having a sump port therein communicating said sump tube with said conduit, a plug in one end of said conduit having a central bore therein, a supply pipe extending through said bore communicating with said source of oil-mist lubricant and having a discharge end located inwardly of said sump tube, an annular sealing ring surrounding the discharge end portion of said supply pipe and bearing against the surface of said conduit to define an annular chamber outwardly concentric with said supply pipe communicating with the sump tube, and an outlet opening through said plug for passage of fluid from said chamber to an ambient pressure zone externally of said shaft.

9. An expander roll assembly as defined in claim 8, wherein each of the endmost spool assemblies at the opposite ends of said roll include an end seal assembly carried by the spool including an annular sealing ring having a base ring portion and a flange portion extending therefrom resiliently bearing against the surface of the shaft, and a metallic annular end cap fixed to the spool of each of said endmost spool assemblies having an annular recess in which said base ring portion is removably seated, an annular plate removably secured to said end cap to retain said sealing ring in said recess, said end cap being located in concentric coaxial relation to the shaft and having a circular center opening for the shaft bounded by a cylindrical surface spaced in close proximity to the surface of the shaft.

10. An expander roll assembly as defined in claim 9, wherein said lubricant conduit is a circular bore concentric with the center axis of the shaft and extending the length of the shaft, and said spray fittings each having a discharge nozzle portion paralleling the axis of the shaft and a threaded inlet nipple at right angles thereto, said ports being threaded openings into which said inlet nipples are threaded.

11. An expander roll assembly as defined in claim 9, wherein each said ball bearing assembly includes an inner and outer race, and said assembly including an annular spacer sleeve concentrically encircling the shaft between each adjacent pair of ball bearing assemblies with its opposite ends abutting the inner races of said ball bearing assemblies, said spacer sleeve having a slot paralleling its axis and opening through one end of the sleeve for slidably accommodating a portion of said spray nozzle fitting.

* * * * *